US008538985B2

(12) United States Patent
Betawadkar-Norwood et al.

(10) Patent No.: US 8,538,985 B2
(45) Date of Patent: Sep. 17, 2013

(54) EFFICIENT PROCESSING OF QUERIES IN FEDERATED DATABASE SYSTEMS

(75) Inventors: Anjali Betawadkar-Norwood, Campbell, CA (US); Hamid Pirahesh, San Jose, CA (US); David Everett Simmen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/046,273

(22) Filed: Mar. 11, 2008

(65) Prior Publication Data

US 2009/0234799 A1 Sep. 17, 2009

(51) Int. Cl.
G06F 17/30 (2006.01)
(52) U.S. Cl.
USPC .......................................................... 707/770
(58) Field of Classification Search
None
See application file for complete search history.

(56) References Cited

U.S. PATENT DOCUMENTS

| 7,243,093 | B2 | 7/2007 | Cragun et al. | |
|---|---|---|---|---|
| 2002/0035559 | A1* | 3/2002 | Crowe et al. | 707/2 |
| 2002/0124116 | A1* | 9/2002 | Yaung | 709/313 |
| 2002/0143755 | A1* | 10/2002 | Wynblatt et al. | 707/3 |
| 2004/0034683 | A1 | 2/2004 | Zhao | |
| 2005/0149584 | A1 | 7/2005 | Bourbonnais et al. | |
| 2005/0192970 | A1 | 9/2005 | Chou et al. | |
| 2006/0047721 | A1 | 3/2006 | Narang et al. | |
| 2007/0050328 | A1 | 3/2007 | Li et al. | |
| 2007/0067274 | A1 | 3/2007 | Han et al. | |
| 2007/0162425 | A1 | 7/2007 | Betawadkar-Norwood et al. | |
| 2007/0203893 | A1 | 8/2007 | Krinsky et al. | |
| 2007/0219972 | A1 | 9/2007 | Cragun et al. | |
| 2007/0226186 | A1 | 9/2007 | Ewen et al. | |
| 2009/0177647 | A1* | 7/2009 | Oliver et al. | 707/5 |

OTHER PUBLICATIONS

Haas, Laura; Eileen Lin, "IBM Federated Database Technology", Mar. 2002, IBM, pp. 1-13.*
Rajasekar, Arcot; "SRB Replicated Data Management for Cooperative Computing." San Diego Supercomputer Center.

* cited by examiner

Primary Examiner — Dinku Gebresenbet
(74) Attorney, Agent, or Firm — Mollborn Patents, Inc.; Fredrik Mollborn

(57) ABSTRACT

Methods and apparatus, including computer program products, implementing and using techniques for processing a federated query in a federated database system. A federated query is received at a federated database server. A federated query execution plan is generated based on the received federated query. The federated query execution plan defines one or more source servers of the federated database and a unique subquery to be executed on each of the source servers. The subqueries are distributed to the source servers in accordance with the federated query execution plan. The respective subqueries are executed asynchronously at the source servers. The subquery results are passed to a first designated source server defined in the federated query execution plan. The subquery results are joined and aggregated at the first designated source server into a final query result. The final query result is returned to the federated database server.

17 Claims, 3 Drawing Sheets

EFFICIENT PROCESSING OF QUERIES IN FEDERATED DATABASE SYSTEMS

BACKGROUND

This invention relates to query processing in federated database systems. A federated database system is a type of database management (DBMS) system which transparently integrates multiple autonomous database systems, referred to below as source servers, into a single federated database. The source servers are interconnected through a computer network and can be geographically decentralized. Since the constituent database systems remain autonomous, a federated database system is often a viable alternative to merging together several disparate databases.

Through data abstraction, federated database systems can provide a uniform frontend user interface, thereby enabling users and clients to store data in and retrieve data from multiple non-contiguous source servers with a single query, even if the constituent source servers are heterogeneous. The federated database management system receives a query from a user or client that references tables stored and managed by one or more source servers, optimizes the query into subqueries that can be executed by those source servers, and coordinates the execution of the received query by distributing the subqueries to the servers for execution, and by combining subquery results into a result for the received query that is returned to the querying user or client. Some common examples of source servers include the DB2 z Series and the Informix IDS series, both available from International Business Machines Corporation of Armonk, N.Y.

A problem with federated query processing is that data from different source servers must be combined on the federated server. The movement of data from the source servers to the federated server requires the federated database system to do a significant amount of processing, and hence use a commensurate amount of system resources, given that there is likely to be a large amount of data transferred from the source servers. Moreover, the computer network might become a bottleneck due to the large amount of data being moved across the network from the source servers to the federated server. Thus, there is a need for more efficient processing techniques for federated queries.

SUMMARY

In general, in one aspect, the invention provides methods and apparatus, including computer program products, implementing and using techniques for processing a federated query in a federated database system. A federated query is received at a federated database server. A federated query execution plan is generated based on the received federated query. The federated query execution plan defines one or more source servers of the federated database and a unique subquery to be executed on each of the source servers. The subqueries are distributed to the source servers in accordance with the federated query execution plan. The respective subqueries are executed asynchronously at the source servers. The subquery results are passed to a first designated source server defined in the federated query execution plan. The subquery results are joined and aggregated at the first designated source server into a final query result. The final query result is returned to the federated database server.

The invention can be implemented to include one or more of the following advantages. The sideways data movement and distributed federated tables described herein can fully exploit the power of existing backend database servers, and can thus achieve orders of magnitude better performance compared to conventional federated database systems, with significantly more efficient user of resources. Only a few modifications need to be made to existing federated database systems, such as the installation of a general purpose messaging system, a stored procedure, and user-defined scalar functions on the source servers.

The invention also allows for "downwards" data movement, which in essence is a special case of the sideways data movement. For example, in some cases, the federated server may host a small table that needs to be joined with a large table on a data source and aggregation needs to be done. Without the techniques described herein, the strategy would be to bring the large table to the federated server and perform join and aggregation there. This would result in large data movement over the network and federated server is doing the heavy processing. Downwards data transfer, on the other hand, in accordance with the various implementations of the invention (or, expressed differently, sideways data transfer where the federated server is one of the participants in the transfer) moves the small table from federated server to the data source, where the join and aggregation with the large table can be performed. After the join and aggregation, only a small result set is moved back to the federated server, thereby saving valuable bandwidth and using the better processing power of the data source, as compared to the federated server.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various embodiments of the invention described herein pertain to query processing in federated database systems. In particular, the various embodiments of the invention relate to the optimization and efficient execution of federated queries that access, join, aggregate and otherwise augment data that is distributed across multiple heterogeneous database management systems, herein referred to as source servers.

In accordance with one aspect of the invention, federated queries can be optimized into query execution plans that, when executed, can move data asynchronously and directly between source servers without going through the federated database management system. This asynchronous and direct transfer of data between source servers will be referred to hereinafter as "sideways data movement".

In accordance with another aspect of the invention, federated queries can be processed in parallel through the optimization and execution of queries that refer to "distributed federated tables," that is, database tables that are replicated, partitioned, or otherwise distributed across multiple source servers. One part of this aspect of the various implementations of the invention extends the sideways data movement to allow for data transfer to be directed or replicated to one of several alternative source servers, based upon distribution criteria received by a query optimizer component of the system. Another part of this second aspect of the various implementations of the invention allows for the declaration of metadata that defines distribution criteria of stored distributed federated tables to a query optimizer component of the system. This metadata is used to optimize queries involving these tables, and in particular, to build execution plans with sideways data movement wherein data transfer is dynamically directed or replicated, or otherwise distributed.

Various implementations of the invention will now be described by way of example and with reference to the drawings. In particular the following description will set forth how the sideways data movement and distributed federated tables can be advantageously used in a scenario where a user wishes to aggregate product sales data. As the skilled reader will realize, product sales data is merely only one use example, and the underlying principles of the various embodiments of the invention as described herein can be used in a wide range of applications and for many different types of data.

Sideways Data Movement

Figure 1:
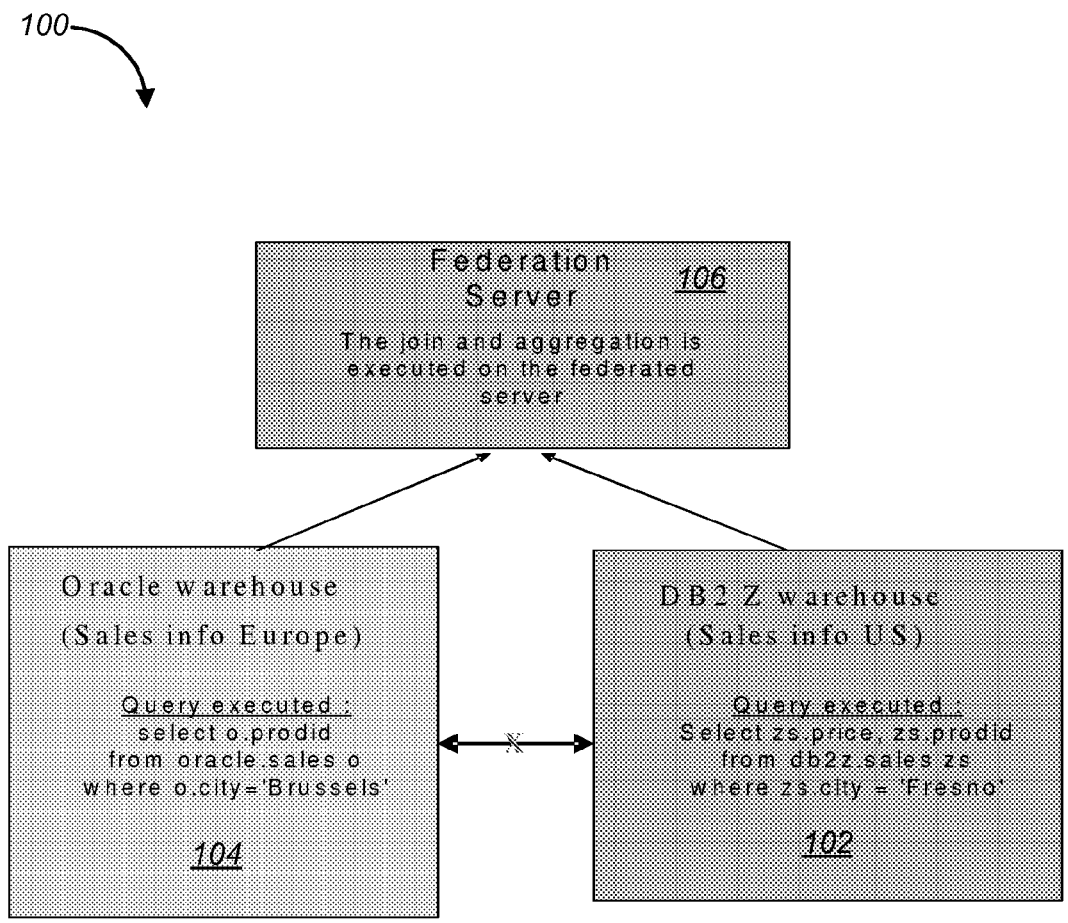
FIG. 1 shows a schematic view of subqueries and data movement in a prior art federated database management system.

As was discussed above, a problem in existing federated query processing is that data from different source servers must be combined on the federated server. Consider, for example, the example query shown in Table 1 below, which seeks the aggregate sales of products sold in Fresno, Calif., that were also sold in Brussels, Belgium:

TABLE 1 select sum(zs.price), zs.prodid
from oracle.sales o, db2z.sales zs
where zs.city = 'Fresno' and o.city='Brussels' and o.prodid = zs.prodid
group by zs.prodid FIG. 1 shows a schematic view of a prior art federated database system (100), in which the query of Table 1 can be conducted. As can be seen in FIG. 1, the information about sales in US cities is in a db2z.sales table managed by a DB2 for z series source server (102), whereas sales information for European cities is in an oracle.sales table managed by an Oracle source server (104). In order to obtain the query result, the federated database system (100) would typically need to: execute a first subquery on the Oracle source server (104) to obtain the sales information for Brussels; execute a second subquery on the zSeries source server (102) to obtain sales results for Fresno; execute a third subquery on the federation server (106) that joins and aggregates the results of the first two subqueries. As can be seen in FIG. 1, the Oracle source server (104) and the zSeries source server (102) cannot communicate directly with each other.

A more efficient strategy for the federated query above, is to move the subquery results for the Fresno sales directly from the Oracle source server (104) to the DB2 for z series source server (102), and to do the join and aggregation there, as will be discussed in further detail below. As a result, the network traffic will be reduced, the computing power of the highly tuned DB2 for z series source server (102) is fully exploited. This movement of data between source servers is referred to as a "sideways data movement." Federated query execution strategies that exploit sideways data movement can result in orders of magnitude better performance, as well as significantly better use of existing systems resources, thus allowing the federation server (106) to act more as a virtual database management system that is focused more on the optimization and coordination aspect of federated query processing and less on the heavy lifting.

In accordance with some implementations of the invention, federated queries can be optimized into query execution plans that exploit sideways data movement. That is, when executed, the query execution plans can move data asynchronously and directly between servers without going through the federation server (106). As will be discussed in further detail below, this approach to sideways data movement requires only the installation of a general purpose messaging system, a stored procedure, and a table functions on the source servers.

Figure 2:
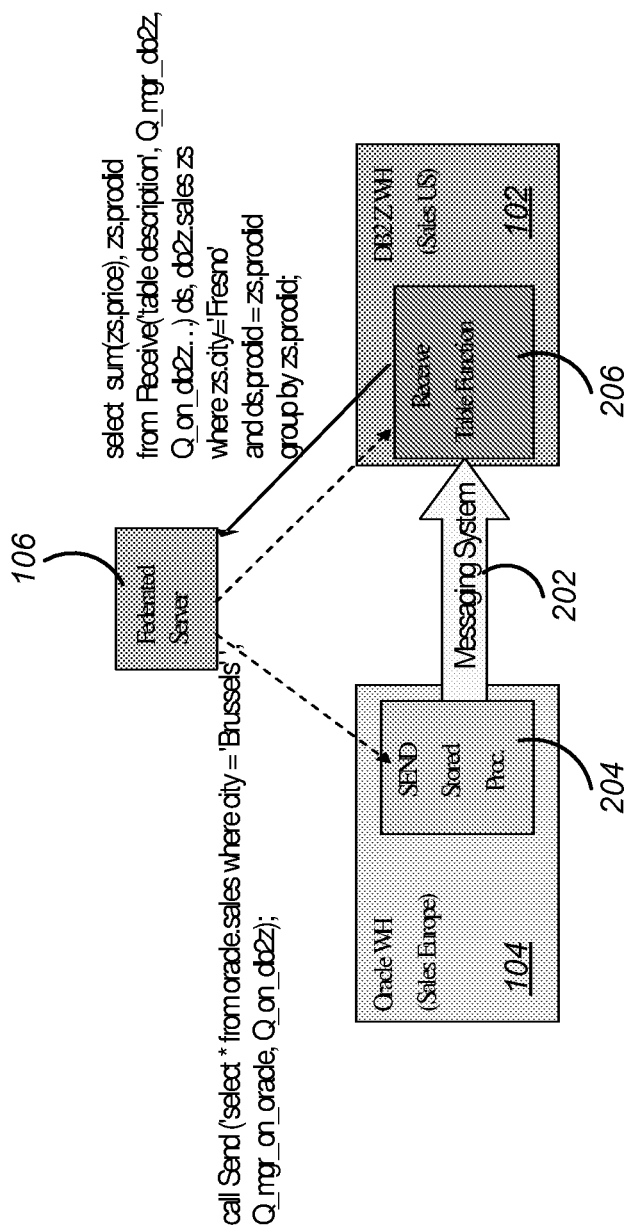
FIG. 2 shows the subqueries and data movement of FIG. 1, but using the sideways data movement, in accordance with one embodiment of the invention.

Using the same example as above, the principles in accordance with one embodiment of the invention are illustrated in FIG. 2. As can be seen in FIG. 2, the federation server (106) will again execute a subquery on the Oracle source server (104) for obtaining the sales information for Brussels. However, in this case, the results of the subquery will not be shipped back the federation server (106). Instead, the results of the subquery will be shipped through a message queue (202) to the source server running DB2 for z Series (102), that is, a sideways data movement is performed.

The message queue (202) can be managed by any general purpose messaging system, such as the WebSphere MQ series, which is available from International Business Machines Corporation of Armonk, N.Y. In parallel, the federation server (106) executes a second subquery on the DB2 for z Series source server (102). This second subquery retrieves the results of the first subquery from the message queue (202), joins that data with the Fresno sales data of the DB2 for z Series source server (102), and finally aggregates the joined data to achieve the final query result, which is returned to the federation server (106).

As the skilled person realizes, this execution strategy allows for less network traffic as only aggregated data is returned to the federation server (106). Moreover, the execution strategy makes better use of existing system resources, as the heavy lifting is done by DB2 for z Series (102), which typically has more processing power than the federation server (106). It should also be noted that the subqueries are executed asynchronously and in parallel, which allows for an overall decrease in elapsed execution time.

In accordance with this implementation, besides the messaging system (202), only a special stored procedure and a special table function need to be installed on each of the source servers. The special stored procedure, referred to in FIG. 2 as the SEND procedure (204), receives a query and the name of a message queue as input. When executed, the SEND procedure (204) creates the message queue (202), runs the subquery, and inserts the subquery results into the message queue (202). In some implementations, the insertion of subquery results into the message queue (202) is done in a pipelined fashion, that is, as rows are produced.

The special table function, referred to in FIG. 2 as the RECEIVE table function (206), takes a description of its output schema, and the name of a message queue (202), as input. When invoked during the process of subquery execution, the table function (206) receives input data from the specified message queue (202), formats that data into rows and columns of appropriate types as per the provided schema, and returns the formatted results as output.

It should be noted that virtually all conventional major database management systems support table functions and stored procedures. Moreover, most enterprise software stacks typically include a general purpose messaging system. Consequently, the approach to sideways data movement described in the above implementation is both feasible and practical. A person skilled in the art of database query processing, and in particular in federated query processing, can readily appreciate the performance benefits of sideways data movement over the existing systems, as well as the elegance and feasibility of the solutions described in the above implementations.

Distributed Federated Tables

There are common business scenarios in which multiple tables residing on different source servers must be treated as the same logical table. These scenarios often occur as a result of acquisitions and mergers. Such a scenario will now be illustrated by extending the above example.

In this extended example, it is assumed that the company interested in obtaining the aggregate sales results acquired a company that sold different products from the parent company. The sales data for the US product suite resides on a source server running Informix IDS. As a result, the US sales data for the merged companies is now effectively partitioned between the DB2 for z Series sales table and the new IDS sales table. Since the product identification number (PRODID) makes it possible to distinguish between products sold by the parent company and products sold by the acquired company, it is possible to write a function that can examine PRODID attribute values and determine whether a row belongs to the IDS partition (i.e. the product was sold by the newly acquired company) or the partition DB2 for z Series partition (containing sales information for products of the parent company).

Furthermore, it is assumed that, because of the expense and complexity involved in merging the data in the DB2 for z Series and IDS source servers, the US division of the company has decided to leave the systems physically separated. The European division of the company, on the other hand, was able to move any European sales relating to products of the acquired company into the Oracle source server.

Thus, in a nutshell, in this example sales information for European products are all contained in a single table managed by the Oracle source server, and the sales information for US products is distributed across tables managed by the IDS and DB2 for z Series source servers. However, as was discussed above, it is possible to write a function that examines a value for the PRODID attribute and determines whether the corresponding product was sold by the parent company or the acquired company. The query is the same as in Table 1 above.

Revisiting the sideways data movement execution strategy illustrated in FIG. 2, now, it is not only necessary to move rows pertaining to Brussels sales results from the Oracle source server (104) directly to the DB2 for z Series server (102), but it might also be necessary to move rows to the IDS source server, depending on the value of the PRODID attribute of a given row. The aforementioned distribution function, which can examine a PRODID attribute value and determine whether the corresponding product was sold by the acquired company or by the parent company, can also be used to determine to which source server a particular row should be directed.

Figure 3:
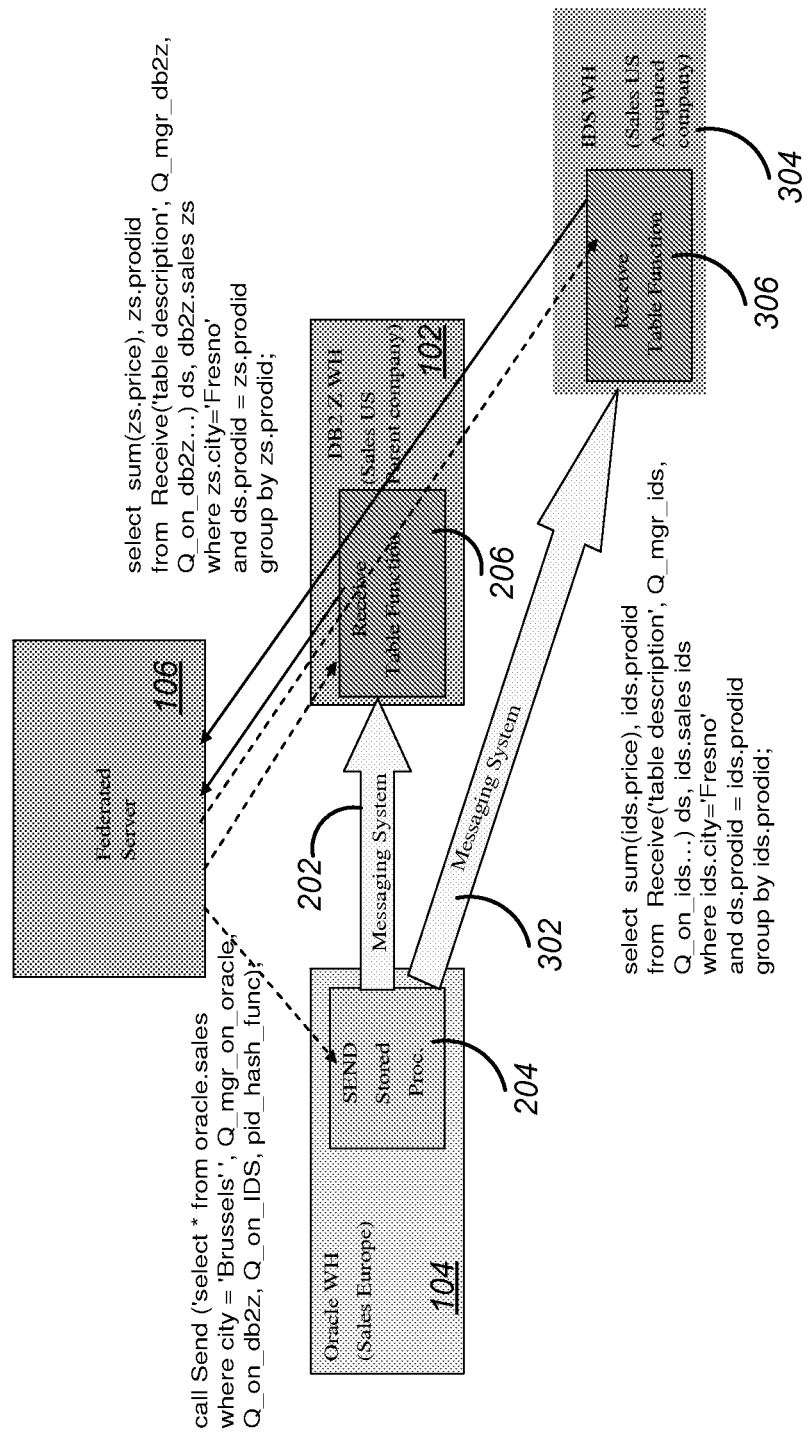
FIG. 3 shows the extensions to the sideways data movement of FIG. 2 in a scenario with distributed federated tables, in accordance with one embodiment of the invention.

Tables that are logically the same, but physically distributed across multiple federated source servers are referred to herein as "distributed federated tables." FIG. 3 shows the scenario described above and illustrates the extensions to the sideways data movement execution strategy that are required to distribute data dynamically to the appropriate source server in accordance with one implementation of the invention.

As can be seen in FIG. 3, the Oracle source server (104) and the DB2 for z Series source server (102) are running essentially the same subqueries that were illustrated and discussed above with respect to FIG. 2. Just like before, the SEND stored procedure (204) and the RECEIVE table function (206) receive the subqueries to execute, the message queues (202, 302) where subquery results will be inserted and received, as well as any needed output schema information. In the scenario illustrated in FIG. 3, though, there is also an IDS source server (304) executing a copy of the same subquery that is executed by the DB2 for z Series source server (102). Moreover, the SEND stored procedure (204) on the Oracle source server (104) is now receiving an additional argument, called "pid_hash_func." This additional argument specifies the name of the distribution function to be used to direct rows from the Oracle source server (104), to either the DB2 for z Series source server (102) or the IDS source server (304). The SEND table function (204) uses this function to decide whether a given result row is inserted into a message queue (202) bound for the DB2 for z Series source server (102), or a message queue (302) bound for the IDS source server (304). The names of the different outbound message queues are also provided as input to the SEND function (204).

The query optimizer component of the system (not shown) uses additional metadata in order to generate such an execution strategy involving sideways data movement and distributed federated tables. This additional metadata includes "server groups", "distribution functions", and "partitioning keys", which together define a distributed federated table to the optimizer component. A sever group represents a set of source servers over which partitions, or replicas, of distributed federated tables reside. Table 2 below shows the declaration of the server group "sales_group" which includes source severs named "DB2Z" and "IDS".

TABLE 2

CREATE SERVER GROUP sales_group ON SOURCE SERVERS (DB2Z, IDS)

A federated distributed table is declared by specifying a server group, distribution function, and (if needed) partitioning keys. The distribution function and partitioning keys essentially indicate how rows are distributed across the source servers identified by the server group. Table 3 below shows an example of the declaration of a federated distributed table that is partitioned across a sever group called "sales_group" using a distribution function "part-prod" applied to the partitioning key attribute "PRODID". The distribution function part-prod is a "sourced function" that is declared to the federated server—so that the federated server knows how to find and invoke the function on each source server—in a separate step not shown in the example of FIG. 3.

TABLE 3

CREATE TABLE us-sales (PRODID INT, PRODNAME VARCHAR(1,000),...) IN SERVER GROUP sales_group DISTRIBUTE BY part-prod PARTITIONING KEYS (PRODID).

Distributed federated tables might also be declared as replicated across source servers as illustrated in Table 4 below. Clearly no actual distribution function is needed on the source servers to implement dynamic replication. The SEND procedure (204) simply inserts a given row into all identified outbound message queues whenever replication is required.

TABLE 4

CREATE TABLE us-sales (PRODID INT, PRODNAME
VARCHAR(1,000),...) IN SERVER GROUP sales_group DISTRIBUTE
BY REPLICATION.

The information received by the optimizer about replicas and distributed tables can be used in a variety of ways. For illustration purposes, one example is as follows. Assume that the source servers are numbered 1, 2, 3, and so on. Furthermore, assume that the optimizer knows, from received metadata, that one table, say Table T1, is distributed on source servers 1 and 2 using a prod_key attribute (for example, that odd prod_keys reside on source server 1 and even prod_keys reside on source server 2), and another table T2 is also distributed the same way on the same source servers. Then any join between tables T1 and T2 that looks for matching prod_key attributes in the two tables can be 'collocated'. This means that no data transfer needs to happen in order to perform this join operation. The reason for this is that all odd prod_key attributes from both tables T1 and T2 can be found on source server and all even keys can be found on source server 2. As the skilled person realizes, voiding the data transfer altogether is even better than making the data transfer more efficient.

Another example showing how the optimizer uses the replicated nature of tables is as follows. Imagine that a table T is distributed on servers 1 and 2) using a prod_key attribute and a table R that is replicated (that is, a full copy of R exists) on servers 1 and 2. Again, any join of T and R would not require any data transfer since table T will find all the necessary data needed for a join with R on both the servers. These optimization strategies exist to deal with tables distributed on multiple nodes in a massively parallel processing (MPP) system. The MPP system is homogeneous with all nodes exactly the same version/level of DB2. These same optimizations can also be extended and exploited to optimize the tables distributed/replicated on heterogeneous source servers. It should be noted again, that these are merely two examples, and that many variations of optimizations can be contemplated by people of ordinary skill in the art.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, in the above examples, the joining and aggregating have typically been done on a particular source server in the federated database system. However, it should be noted that any and all the source servers may perform these operations and pass the data on to other source servers using the sideways mechanism described above. Thus, the capabilities of the systems and methods described herein are certainly not limited to performing these operations only on the types of source servers described above. Accordingly, other embodiments are within the scope of the following claims.

The invention claimed is:

1. A computer-implemented method for processing a federated query in a federated database system, wherein a database table is physically distributed across a first designated source server and a second designated source server, the method comprising:
receiving a federated query at a federated database server;
generating a federated query execution plan at the federated database server, based on the received federated query, the federated query execution plan defining one or more source servers of the federated database and a unique subquery to be executed on each of the defined one or more source servers;
distributing each unique subquery to a defined source server, in accordance with the federated query execution plan;
executing each unique subquery asynchronously by the defined source server;
connecting a source server to a first designated source server among the one or more source servers, using a first message queue, and without the connection passing through the federated database server;
connecting a source server to a second designated source server among the one or more source servers, using a second message queue, and without the connection passing through the federated database server;
passing, based on parameters specified in the federated query, a first subset of the subquery results to the first designated source server, using the first message queue, and a second subset of the subquery results to the second designated source server, using the second message queue;
joining and aggregating the first subset of the subquery results by the first designated source server into a first final query result;

joining and aggregating the second subset of the subquery results by the second designated source server into a second final query result;

returning the first and second final query results to the federated database server; and combining the first and second final query results at the federated database server.

2. The method of claim 1, wherein passing the first and second subsets of the query results comprises:

determining whether a subquery result is to be sent to the first designated source server or to the second designated source server;

inserting the subquery results from the source server into the first message queue in response to determining that the subquery results should be sent to the first designated source server; and inserting the subquery results from the source server into the second message queue in response to determining that the subquery should be sent to the second designated source server.

3. The method of claim 2, wherein inserting the subquery results in the first and second message queues, respectively, includes inserting the subquery results into either the first message queue or into the second message queue as rows are produced.

4. The method of claim 1, wherein joining and aggregating the first subset comprises:

receiving the first subset of subquery results from the first message queue; and formatting the received first subset of subquery results into rows and columns of appropriate types to generate a first final query result.

5. The method of claim 1, wherein joining and aggregating the second subset comprises:

receiving the second subset of subquery results from the first message queue; and formatting the received second subset of subquery results into rows and columns of appropriate types to generate a second final query result.

6. The method of claim 1, further comprising:

replicating the physically distributed database table onto one or more additional source servers in the federated database system; and using the information about the replicas of the distributed database table in generating the federated query execution plan.

7. The method of claim 1, wherein generating a federated query execution plan includes:

optimizing the federated query based on metadata to generate an execution strategy involving sideways data movement.

8. The method of claim 7, wherein the metadata includes one or more of: a server group representing a set of source servers over which partitions or replicas of the distributed database table reside, and a distribution function and a partitioning key indicating how rows of the distributed database table are distributed across the source servers identified by the server group.

9. A computer program product comprising a non-transitory tangible computer useable medium including a computer readable program, wherein the computer readable program when executed on a computer causes the computer to:

receive a federated query at a federated database server;

generate a federated query execution plan at the federated database server, based on the received federated query, the federated query execution plan defining one or more source servers of the federated database and a unique subquery to be executed on each of the defined one or more source servers, wherein a database table is physically distributed across a first designated source server and a second designated source server;

distribute each unique subquery to a defined source server, in accordance with the federated query execution plan;

execute each unique subquery asynchronously by the defined source server;

connect a source server to a first designated source server among the one or more source servers, using a first message queue, and without the connection passing through the federated database server;

connect a source server to a second designated source server among the one or more source servers, using a second message queue, and without the connection passing through the federated database server;

pass, based on parameters specified in the federated query, a first subset of the subquery results to the first designated source server, using the first message queue, and a second subset of the subquery results to the second designated source server, using the second message queue;

join and aggregate the first subset of the subquery results by the first designated source server into a first final query result;

join and aggregate the second subset of the subquery results by the second designated source server into a second final query result;

return the first and second final query results to the federated database server; and combine the first and second final query results at the federated database server.

10. The computer program product of claim 9, wherein passing the first and second subsets of the query results comprises:

determining whether a subquery result is to be sent to the first designated source server or to the second designated source server;

inserting the subquery results from the source server into the first message queue in response to determining that the subquery results should be sent to the first designated source server; and inserting the subquery results from the source server into the second message queue in response to determining that the subquery should be sent to the second designated source server.

11. The computer program product of claim 10, wherein inserting the subquery results in the first and second message queues, respectively, includes inserting the subquery results into either the first message queue or into the second message queue as rows are produced.

12. The computer program product of claim 9, wherein joining and aggregating the first subset comprises:

receiving the first subset of subquery results from the first message queue; and formatting the received first subset of subquery results into rows and columns of appropriate types to generate a first final query result.

13. The computer program product of claim 9, wherein joining and aggregating the second subset comprises:

receiving the second subset of subquery results from the first message queue; and formatting the received second subset of subquery results into rows and columns of appropriate types to generate a second final query result.

14. The computer program product of claim 9, wherein the computer readable program when executed on a computer further causes the computer to:

replicate the physically distributed database table onto one or more additional source servers in the federated database system; and use the information about the replicas of the distributed database table in generating the federated query execution plan.

15. The computer program product of claim 9, wherein generating a federated query execution plan includes:

optimizing the federated query based on metadata to generate an execution strategy involving sideways data movement.

16. The computer program product of claim 15, wherein the metadata includes one or more of: a server group representing a set of source servers over which partitions or replicas of the distributed database table reside, and a distribution function and a partitioning key indicating how rows of the distributed database table are distributed across the source servers identified by the server group.

17. A federated database system for processing federated queries, comprising:

a federated database server;

one or more source servers, wherein a database table is physically distributed across a first designated source server and a second designated source server; and a messaging system connecting the federated database server and the one or more source servers, wherein:

the federated database server is operable to:

receive a federated query;

generate a federated query execution plan based on the received federated query, the federated query execution plan defining one or more source servers of the federated database and a unique subquery to be executed on each of the defined one or more source servers;

distribute each unique subquery to a defined source server, in accordance with the federated query execution plan;

the one or more source servers are operable to:

execute each unique subquery asynchronously by the defined source server;

connect a source server to a first designated source server among the one or more source servers, using a first message queue, and without the connection passing through the federated database server;

connect a source server to a second designated source server among the one or more source servers, using a second message queue, and without the connection passing through the federated database server;

pass, based on parameters specified in the federated query, a first subset of the subquery results to the first designated source server, using the first message queue, and a second subset of the subquery results to the second designated source server, using the second message queue;

join and aggregate the first subset of the subquery results by the first designated source server into a first final query result;

join and aggregate the second subset of the subquery results by the second designated source server into a second final query result;

return the first and second final query results to the federated database server; and combine the first and second final query results at the federated database server.

* * * * *